US012646653B2

(12) United States Patent　　　　(10) Patent No.:　US 12,646,653 B2
Nakanishi　　　　　　　　　　　　　(45) Date of Patent:　　Jun. 2, 2026

(54) MULTILAYER CERAMIC ELECTRONIC COMPONENT INCLUDING INTERNAL ELECTRODES WITH BENT AND SLOPED PORTIONS

(71) Applicant: Murata Manufacturing Co., Ltd., Nagaokakyo (JP)

(72) Inventor: Toru Nakanishi, Nagaokakyo (JP)

(73) Assignee: MURATA MANUFACUTRING CO., LTD., Kyoto (JP)

(\*) Notice: Subject to any disclaimer, the term of this patent is extended or adjusted under 35 U.S.C. 154(b) by 145 days.

(21) Appl. No.: 18/621,220

(22) Filed: Mar. 29, 2024

(65) Prior Publication Data

US 2025/0299880 A1　　Sep. 25, 2025

(30) Foreign Application Priority Data

Mar. 19, 2024　(JP) ................................ 2024-043442

(51) Int. Cl.
　　*H01G 4/005*　　　(2006.01)
　　*H01G 4/12*　　　　(2006.01)
　　*H01G 4/232*　　　(2006.01)
　　*H01G 4/30*　　　　(2006.01)

(52) U.S. Cl.
　　CPC ........... *H01G 4/005* (2013.01); *H01G 4/1227* (2013.01); *H01G 4/2325* (2013.01); *H01G 4/30* (2013.01)

(58) Field of Classification Search
　　CPC .. H01G 4/0085; H01G 4/2325; H01G 4/1227; H01G 4/30; H01G 4/005
　　See application file for complete search history.

(56) References Cited

U.S. PATENT DOCUMENTS

| | | | |
|---|---|---|---|
| 2012/0019982 A1* | 1/2012 | Sasaki | H01G 4/002 |
| | | | 361/321.1 |
| 2015/0116902 A1* | 4/2015 | Sakai | H01G 4/232 |
| | | | 361/301.4 |
| 2020/0303125 A1* | 9/2020 | Tsuru | H01G 4/1227 |
| 2021/0166874 A1* | 6/2021 | Tanaka | H01G 4/005 |
| 2023/0020333 A1 | 1/2023 | Shimada | |

FOREIGN PATENT DOCUMENTS

| | | | |
|---|---|---|---|
| JP | 2001155959 A | * | 6/2001 |
| JP | 2002015942 A | * | 1/2002 |
| JP | 2003-243249 A | | 8/2003 |
| KR | 20230009287 A | | 1/2023 |

\* cited by examiner

*Primary Examiner* — David M Sinclair

(74) *Attorney, Agent, or Firm* — Keating & Bennett, LLP

(57)　　　　　　　ABSTRACT

A multilayer ceramic electronic component includes a first extension portion including a bent portion in a cross section. The multilayer body is divided into four regions by a straight line passing through a middle portion of the multilayer body in a lamination direction and a straight line passing through a middle portion of the multilayer body in a length direction, and a region adjacent to a first main surface and a first end surface among the divided four regions is defined as a first reference region, and a regression line derived based on values of x and y with respect to the bent portion in a reference region is defined as a virtual connection line, the virtual connection line intersects an effective layer portion.

20 Claims, 5 Drawing Sheets

MULTILAYER CERAMIC ELECTRONIC COMPONENT INCLUDING INTERNAL ELECTRODES WITH BENT AND SLOPED PORTIONS

CROSS REFERENCE TO RELATED APPLICATIONS

This application claims the benefit of priority to Japanese Patent Application No. 2024-043442 filed on Mar. 19, 2024. The entire contents of this application are hereby incorporated herein by reference.

BACKGROUND OF THE INVENTION

1. Field of the Invention

The present invention relates to multilayer ceramic electronic components.

2. Description of the Related Art

In the related art, a multilayer ceramic capacitor has been known as a multilayer ceramic electronic component. Generally, multilayer ceramic capacitors each include a multilayer body including a plurality of dielectric layers and a plurality of internal electrode layers that are alternately laminated, and external electrodes provided respectively on one of both end surfaces of the multilayer body. For example, Japanese Unexamined Patent Application Publication No. 2003-243249 discloses a multilayer ceramic capacitor including the above-described configuration and further including a configuration in which each of the external electrodes includes a base electrode layer provided by firing.

In multilayer ceramic capacitors, for example, in a cutting step of a multilayer chip, a phenomenon whereby an internal electrode is peeled off from an adjacent dielectric (referred to as "interface peeling") may occur. Such interfacial peeling reduces the yield of the product.

SUMMARY OF THE INVENTION

Example embodiments of the present invention provide multilayer ceramic electronic components that are each able to reduce or prevent an occurrence of interface peeling.

An example embodiment of the present invention provides a multilayer ceramic electronic component that includes a multilayer body including an inner layer portion including a plurality of ceramic layers and a plurality of internal electrodes that are alternately laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction, and external electrodes respectively on one of the first end surface or the second end surface, in which each of the plurality of internal electrodes includes a counter portion opposed to an adjacent internal electrode in the lamination direction and an extension portion extending from the counter portion and connected to one of the external electrodes, the multilayer body includes an effective layer portion including the counter portion of each of the plurality of internal electrodes and portions of the plurality of ceramic layers sandwiched between the counter portions that are adjacent to each other, when directions from a middle portion of the multilayer body in the lamination direction to each of the first main surface and the second main surface in the lamination direction are each defined as a lamination direction outer side, and directions from each of the first main surface and the second main surface to the middle portion of the multilayer body in the lamination direction are each defined as a lamination direction center side, and a cross section parallel or substantially parallel to the lamination direction and the length direction is defined as an LT cross section, in the LT cross section, the extension portion includes a first slope portion extending from the counter portion and sloped toward the lamination direction center side in a direction from the counter portion toward a side spaced away from the counter portion, a second slope portion extending from the first slope portion toward the side spaced away from the counter portion and sloped toward the lamination direction outer side in a direction from the counter portion toward the side spaced away from the counter portion, and a bent portion connecting the first slope portion and the second slope portion, when a straight line tangent to one of the first end surface or the second surfaces and extending parallel or substantially parallel to the lamination direction is defined as an end surface side reference line, a straight line tangent to one of the first main surface or the second main surface and extending parallel or substantially parallel to the length direction is defined as a main surface side reference line, a distance between the bent portion and the end surface side reference line is defined as x, a distance between the bent portion and the main surface side reference line is defined as y, the multilayer body is divided into four regions by a straight line passing through the middle portion of the multilayer body in the lamination direction and a straight line passing through a middle portion of the multilayer body in the length direction, and one of the divided four regions is defined as a reference region, and a regression line derived based on values of the x and the y with respect to the bent portion in the reference region is defined as a virtual connection line, the virtual connection line intersects the effective layer portion.

According to example embodiments of the present invention, it is possible to provide multilayer ceramic electronic components that are each able to reduce or prevent the occurrence of interface peeling.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is an enlarged view in the vicinity of a first reference region in FIG. 2.

FIG. 5 is a view of a multilayer ceramic capacitor according to a third example embodiment of the present invention, and corresponds to FIG. 3.

DETAILED DESCRIPTION OF THE EXAMPLE EMBODIMENTS

Example embodiments of the present invention will be described in detail below with reference to the drawings.

First Example Embodiment

Hereinafter, a multilayer ceramic capacitor 1 according to a first example embodiment of the present invention will be described with reference to FIGS. 1 and 2. The multilayer ceramic capacitor 1 corresponds to a multilayer ceramic electronic component.

Multilayer Ceramic Capacitor 1

Figure 1:
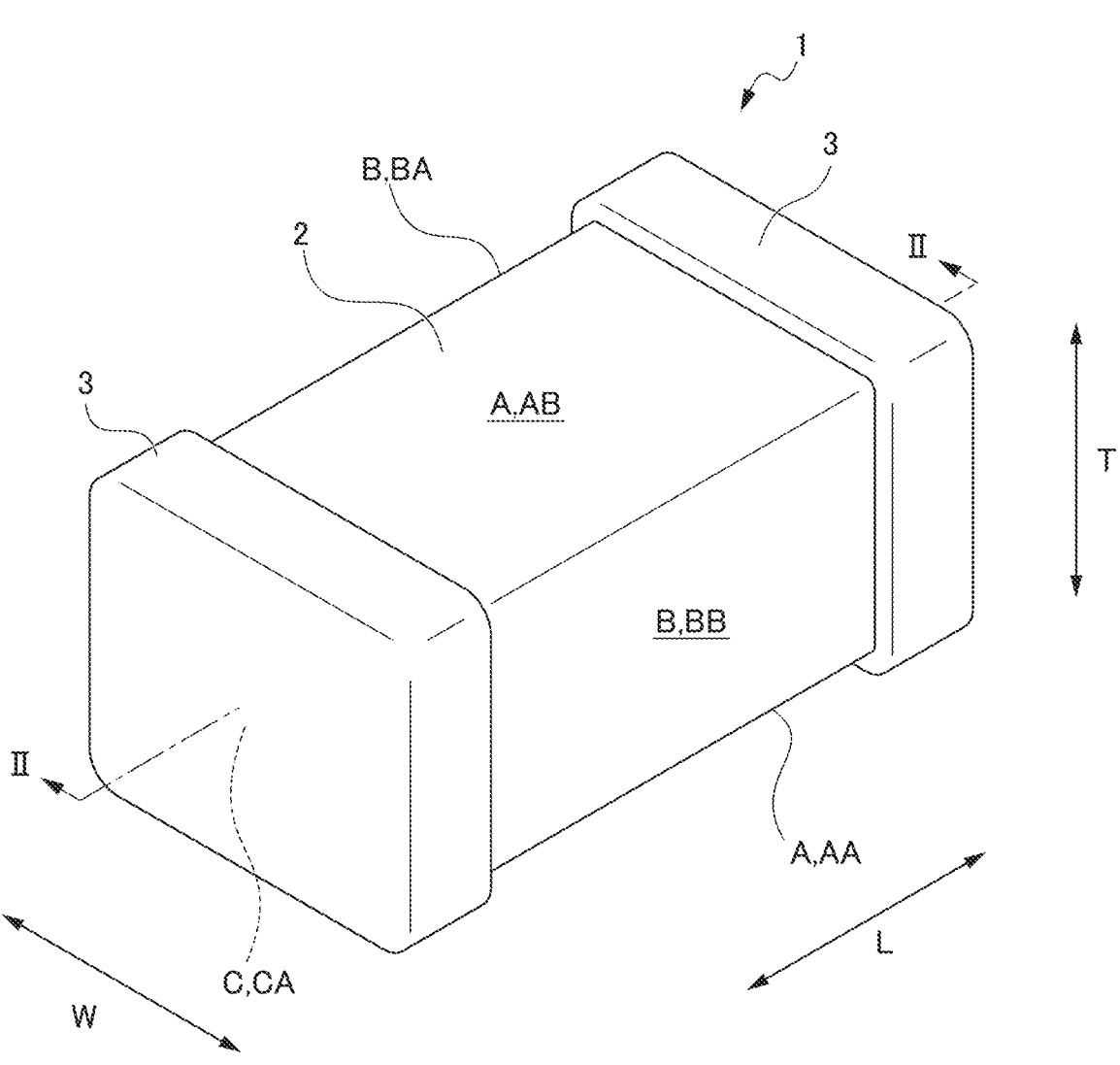
FIG. 1 is a schematic perspective view of a multilayer ceramic capacitor according to a first example embodiment of the present invention.

As shown in FIG. 1, the multilayer ceramic capacitor 1 is a multilayer ceramic capacitor including a two-terminal structure. The multilayer ceramic capacitor 1 includes a multilayer body 2 and a pair of external electrodes 3. The multilayer body 2 has a rectangular or substantially rectangular parallelepiped shape and has six outer surfaces. The multilayer body 2 includes an inner layer portion 11 including a plurality of dielectric layers 14 and a plurality of internal electrodes 15 that are laminated therein.

In the present specification, a direction in which the plurality of dielectric layers 14 and the plurality of internal electrodes 15 are laminated in the multilayer ceramic capacitor 1 is referred to as a lamination (stacking) direction T. One of the directions orthogonal or substantially orthogonal to the lamination direction T is referred to as a length direction L. A direction orthogonal or substantially orthogonal to the length direction L and the lamination direction T is referred to as a width direction W. With regard to the lamination direction T, the direction from the middle portion of the multilayer body 2 to each main surface A in the lamination direction T is referred to as a "lamination direction outer side T1", and the direction from each main surface A to the middle portion of the multilayer body 2 in the lamination direction T is referred to as a "lamination direction center side T2".

A cross section parallel or substantially parallel to the lamination direction T and the length direction L is referred to as an "LT cross section". The cross section of FIG. 2 refers to a cross section passing through the middle portion of the multilayer ceramic capacitor 1 in the width direction W.

Among the six outer surfaces of the multilayer body 2, a pair of outer surfaces on both sides in the lamination direction T is referred to as a first main surface AA and a second main surface AB, a pair of outer surfaces extending in the lamination direction T and provided on both sides in the width direction W is referred to as a first lateral surface BA and a second lateral surface BB, and a pair of outer surfaces extending in the lamination direction T and provided on both sides in the length direction L is referred to as a first end surface CA and a second end surface CB. The first main surface AA and the second main surface AB may be collectively referred to as "each main surface A". The first lateral surface BA and the second lateral surface BB may be collectively referred to as "each lateral surface B". The first end surface CA and the second end surface CB may be collectively referred to as "each end surface C".

One of the pair of external electrodes 3 is on one of the end surfaces C, and the other one of the pair of external electrodes 3 is on the other one of the end surfaces C. The external electrodes 3 are provided in the length direction L.

The dimension in the length direction L of the multilayer ceramic capacitor 1 is, for example, preferably about 0.2 mm or more and about 10 mm or less, and more preferably about 0.2 mm or more and about 6 mm or less. The dimension in the lamination direction T of the multilayer ceramic capacitor 1 is, for example, preferably about 0.05 mm or more and about 10 mm or less, and more preferably about 0.1 mm or more and about 5 mm or less. The dimension of the multilayer ceramic capacitor 1 in the width direction W is, for example, preferably about 0.1 mm or more and about 10 mm or less, and more preferably about 0.1 mm or more and about 5 mm or less.

Multilayer Body 2

Figure 2:
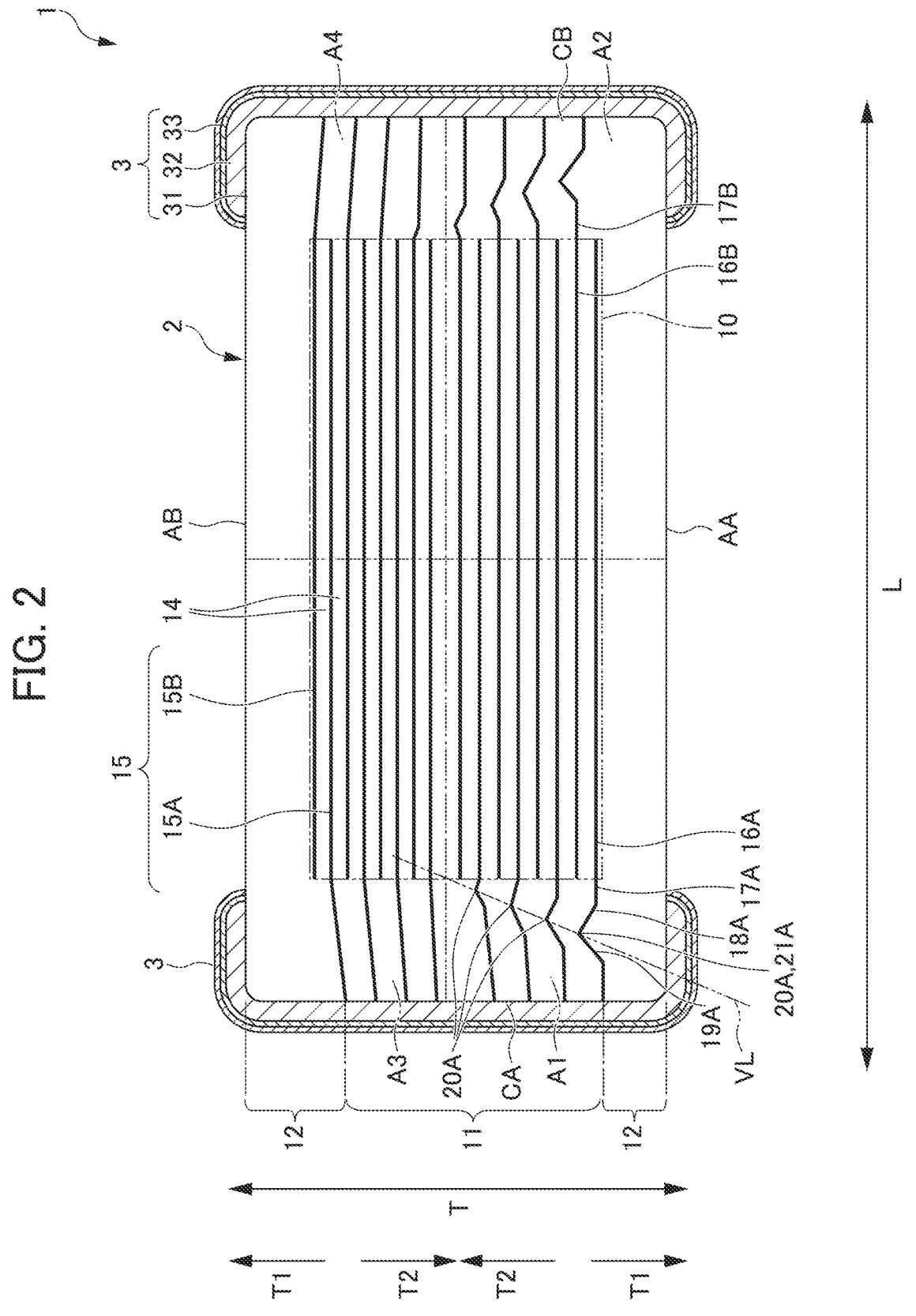
FIG. 2 is a cross-sectional view taken along the line II-II of FIG. 1.

As shown in FIG. 2, the multilayer body 2 includes an inner layer portion 11 and a pair of outer layer portions 12 that sandwich the inner layer portion 11 in the lamination direction T. The multilayer body 2 preferably has rounded corner portions and ridge portions. Each of the corner portions is a portion where three surfaces of the multilayer body intersect. Each of the ridge portions is a portion where two surfaces of the multilayer body intersect.

The dimension in the length direction L of the multilayer body 2 is, for example, preferably about 0.2 mm or more and about 10 mm or less, and more preferably about 0.2 mm or more and about 6 mm or less. The dimension of the multilayer body 2 in the lamination direction T is, for example, preferably about 0.05 mm or more and about 10 mm or less, and more preferably about 0.1 mm or more and about 5 mm or less. The dimension of the multilayer body 2 in the width direction W is, for example, preferably about 0.1 mm or more and about 10 mm or less, and more preferably about 0.1 mm or more and about 5 mm or less.

Inner Layer Portion 11

The inner layer portion 11 includes a plurality of dielectric layers 14 defining and functioning as a plurality of ceramic layers and a plurality of internal electrodes 15. The plurality of dielectric layers 14 and the plurality of internal electrodes 15 are alternately laminated therein.

Each of the dielectric layers 14 is made of, for example, a dielectric ceramic including $BaTiO_3$ as a main component. The dielectric ceramic may include, for example, Mn compound, Fe compound, Cr compound, Co compound, Ni compound or the like as a subcomponent. The dimension of each of the dielectric layers 14 in the lamination direction T is, for example, preferably about 0.2 $\mu$m or more and about 15 $\mu$m or less, and more preferably about 0.5 $\mu$m or more and about 2.0 $\mu$m or less.

Each of the internal electrodes 15 is made of a metal material such as, for example, Ni, Cu, Ag, Pd, Ag—Pd alloy, or Au. The internal electrode 15 includes a plurality of first internal electrodes 15A and a plurality of second internal electrodes 15B. The plurality of first internal electrodes 15A are exposed only at the first end surface CA. The plurality of second internal electrodes 15B are exposed only at the second end surface CB. The plurality of first internal electrodes 15A and the plurality of second internal electrodes 15B are alternately provided.

Each of the first internal electrodes 15A may include a first counter portion 16A and a first extension portion 17A. Each of the first counter portions 16A is a portion of the first internal electrode 15A and is opposed to the second internal electrode 15B adjacent to the first internal electrode 15A in the lamination direction T. Each of the first counter portions 16A is positioned in the middle portion between the end surfaces C. Each of the first extension portions 17A is a portion of the first internal electrode 15A and extends from the first counter portion 16A toward the first end surface CA. Each of the first extension portions 17A is exposed at the first end surface CA.

Each of the second internal electrodes 15B includes a second counter portion 16B and a second extension portion 17B. Each of the second counter portions 16B is a portion of the second internal electrode 15B and is opposed to the adjacent first internal electrode 15A (the first counter portion 16A). Each of the second counter portions 16B is positioned in the middle portion between the end surfaces C. Each of the second extension portions 17B is a portion of the second internal electrode 15B and extends from the second counter portion 16B toward the second end surface CB. Each of the second extension portions 17B is exposed at the second end surface CB.

The plurality of first internal electrodes 15A and the plurality of second internal electrodes 15B may be collectively referred to as an "internal electrode 15". The plurality of first counter portions 16A and the plurality of second counter portion 16B may be collectively referred to as a "counter portion 16".

The dimension of each of the internal electrodes 15 in the lamination direction T is, for example, preferably about 0.2 μm or more and about 2.0 μm or less. The total number of the plurality of first internal electrodes 15A and the plurality of second internal electrodes 15B is, for example, preferably 10 to 700, and more preferably 15 to 1000.

The counter portion 16 and portions of the dielectric layers 14 sandwiched between adjacent counter portions 16 are collectively referred to as an "effective layer portion 10". In other words, the multilayer body 2 includes the effective layer portion 10, and the effective layer portion 10 includes the respective counter portions 16 and portions of the respective dielectric layers 14 sandwiched by the adjacent counter portions 16. The effective layer portion 10 is a portion where capacitance is generated.

Outer Layer Portion 12

Each of the outer layer portions 12 is preferably made of the same material as that of the dielectric layers 14 of the inner layer portion 11. None of the outer layer portions 12 include any internal electrode 15. The total number of dielectric layers 14 including each of the outer layer portions 12 is, for example, preferably 10 to 1200, and more preferably 15 to 700.

External Electrode 3

The external electrodes 3 are respectively on one of the end surfaces C. Each of the external electrodes 3 covers not only the end surface C, but also a portion of the main surface A and a portion of the lateral surface B. The plurality of first internal electrodes 15A are connected to either one of the external electrodes 3, and the plurality of second internal electrodes 15B are connected to the other one of the external electrodes 3. Each of the external electrodes 3 includes a base electrode layer 31 in contact with the surface of the multilayer body 2, a first plated layer 32 on the base electrode layer 31, and a second plated layer 33 on the first plated layer 32.

The base electrode layer 31 is, for example, a fired layer including an electrically conductive metal such as Cu (copper), and glass. The first plated layer 32 is, for example, a Ni (nickel) plated layer. The second plated layer 33 is, for example, a Sn (tin) plated layer.

The thickness of a portion of the base electrode layer 31 provided on the end surface C is, for example, preferably about 2 μm or more and about 220 μm or less, and more preferably about 3 μm or more and about 200 μm or less. The thickness of a portion of base electrode layer 31 provided on either one of the main surface A or the lateral surface B is, for example, preferably about 3 μm or more and about 40 μm or less, and more preferably about 4 μm or more and about 25 μm or less. The thickness of the first plated layer 32 and the thickness of the second plated layer 33 are, for example, preferably about 1 μm or more and about 15 μm or less, and more preferably about 2 μm or more and about 10 μm or less.

Each of the external electrodes 3 may include an electrically conductive resin layer. In this case, the thickness of the electrically conductive resin layer is, for example, preferably about 10 μm or more and about 150 μm or less. The base electrode layer 31 may be a thin film layer such as, for example, a sputtered electrode. The base electrode layer 31 may not be provided. For example, the first plated layer 32 may be provided directly on the multilayer body 2.

Here, the multilayer body 2 is divided into four regions by a straight line passing through the middle portion of the multilayer body 2 in the lamination direction T and a straight line passing through the middle portion of the multilayer body 2 in the length direction L. Among the four regions, the region on the first main surface AA side and the first end surface CA side is referred to as a "first reference region A1", the region on the first main surface AA side and the second end surface CB side is referred to as a "second reference region A2", the region on the second main surface AB side and the first end surface CA side is referred to as a "third reference region A3", and the region on the second main surface AB side and the second end surface CB side is referred to as a "fourth reference region A4". The first reference region A1, the second reference region A2, the third reference region A3, and the fourth reference region A4 correspond to reference regions, respectively.

The multilayer ceramic capacitor 1 includes a symmetrical or substantially symmetrical configuration when viewed in the length direction L. Therefore, the first reference region A1 and the second reference region A2 are symmetrical or substantially symmetrical when viewed in the length direction L. The third reference region A3 and the fourth reference region A4 are symmetrical or substantially symmetrical when viewed in the length direction L.

Figure 3:
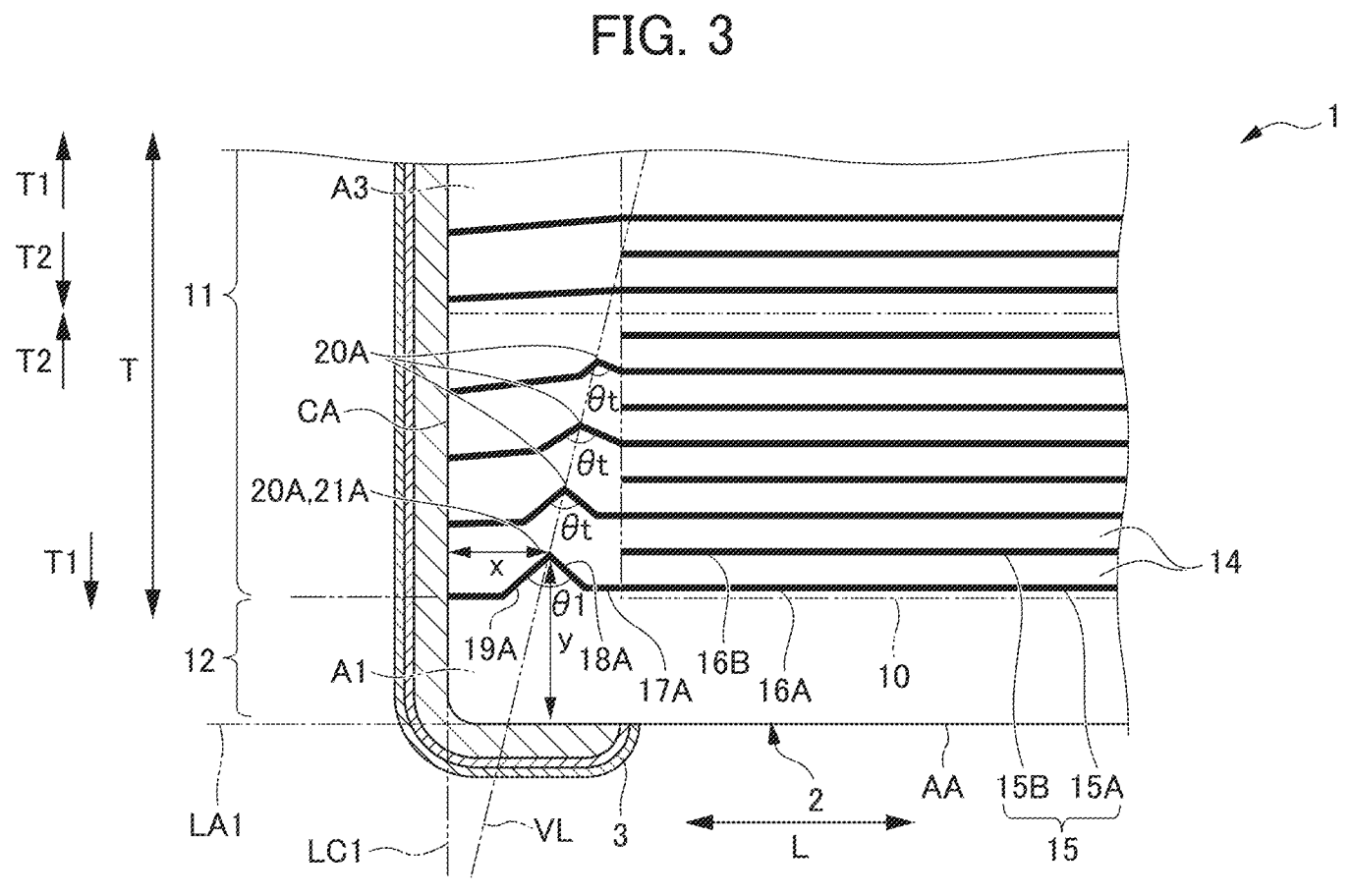

As shown in FIG. 3, in the LT cross section of the first reference region A1, the first extension portion 17A includes a first slope portion 18A that extends from the first counter portion 16A and is sloped toward the lamination direction center side in the direction T2 from the first counter portion 16A toward the side spaced away from the first counter portion 16A, a second slope portion 19A that extends from the first slope portion 18A toward the side spaced away from the first counter portion 16A and is sloped toward the lamination direction outer side T1 in the direction from the first counter portion 16A toward the side spaced away from the first counter portion 16A, and a bent portion 20A connecting the first slope portion 18A and the second slope portion 19A.

A straight line that is tangent to the first end surface CA and extends parallel or substantially parallel to the lamination direction T is referred to as a "first end surface side reference line LC1". A straight line that is tangent to the first main surface AA and extends parallel or substantially parallel to the length direction L is referred to as a "first main surface side reference line LA1". The distance from the first end surface side reference line LC1 is defined as "x". The distance from the first main surface side reference line LA1 is defined as "y". The position of the bent portion 20A can be represented by x and y coordinates, respectively.

A regression line derived based on the values of x and y with respect to the bent portion 20A in the first reference region A1 is defined as a virtual connection line VL. An example of a method of deriving the regression line is a least squares method.

The virtual connection line VL intersects the effective layer portion 10. Among the internal electrodes 15 adjacent to each other in the lamination direction T, the bent portions 20A of the internal electrodes 15 located adjacent to the lamination direction center side T2 are closer to the effective layer portion 10 than the bent portions 20A of the internal electrodes 15 located adjacent to the lamination direction outer side T1.

It suffices if the virtual connection line VL intersects the effective layer portion 10 on the LT cross section, and need not intersect the effective layer portion 10 in the first reference region A1. For example, the virtual connection line VL may intersect the effective layer portion 10 in the third reference region A3. Further, the virtual connection line VL does not need to actually pass through all of the bent portions 20A in the first reference region A1.

The bent portion 20A located at the outermost position on the lamination direction outer side T1 is referred to as an outermost bent portion 21A. The bending angle of the outermost bent portion 21A is smaller than the bending angles of the bent portions 20A located adjacent to the lamination direction center side T2. In FIG. 3, the bending angle of the outermost bent portion 21A is denoted by "θ1", and the bending angles of the bent portions 20A positioned closer to the lamination direction center side T2 than the outermost bent portion 21A is denoted by "θt".

In a case of measuring the distance and the angle inside the multilayer body 2, the multilayer body 2 is polished to expose a predetermined cross section in the middle of the LT cross section passing through the width direction W of the multilayer body 2. Next, the cross section exposed by a scanning electron microscope is observed, and various values are measured.

In the LT cross section of the third reference region A3, the first extension portion 17A may or may not include a bent portion. However, in a case in which at least one of the first extension portions 17A in the third reference region A3 includes a bent portion, the first extension portion 17A in the third reference region A3 preferably includes a configuration corresponding to the first extension portions 17A in the first reference region A1.

Method of Manufacturing Multilayer Ceramic Capacitor 1

Next, an example of a method of manufacturing the multilayer ceramic capacitor 1 of the present example embodiment will be described. The method of manufacturing the multilayer ceramic capacitor 1 of the present example embodiment is not limited as long as it satisfies the above-described requirements. However, a manufacturing method preferably includes the following steps, for example. The details of each step will be described below.

Dielectric sheets for manufacturing the dielectric layers 14 and an electrically conductive paste for manufacturing the internal electrodes 15 are prepared. The dielectric sheets and the electrically conductive paste for manufacturing the internal electrodes include a binder and a solvent. The binder and the solvent may be well known.

The electrically conductive paste for manufacturing the internal electrodes 15 is printed on the dielectric sheets in a predetermined pattern by, for example, screen printing or gravure printing. Thus, dielectric sheets including a pattern of the first internal electrodes 15A and dielectric sheets including a pattern of the second internal electrodes 15B are prepared.

By laminating a predetermined number of dielectric sheets on which the patterns of internal electrodes are not printed, a portion defining and functioning as the first main surface side outer layer portion 12A adjacent to the first main surface AA is formed. On the first main surface side outer layer portion 12A, the dielectric sheets on which the pattern of the first internal electrodes 15A is printed and the dielectric sheets on which the pattern of the second internal electrodes 15B is printed are sequentially laminated, a such that portion defining and functioning as the inner layer portion 11 is formed. On the inner layer portion 11, a predetermined number of dielectric sheets on which the patterns of the internal electrodes are not printed are laminated on a portion defining and functioning as the inner layer portion 11, such that a portion defining and functioning as the second main surface side outer layer portion 12B adjacent to the second main surface AB is formed. Thus, the multilayer sheet is manufactured.

The multilayer sheet is pressed in the lamination direction by, for example, a hydrostatic press or the like to form a multilayer block. In addition, at the time of hydrostatic press, the multilayer sheet is sandwiched by metal plates having protruding shapes in a location corresponding to a region (extension region) in the length direction L corresponding to the region where the extension portions of the internal electrode layers exist in the multilayer sheet, such that the density at the middle portion in the lamination direction of the extension region increases before the other portions of the extension region, and thus bending in the extension region occurs in the regions other than the middle portion, thus obtaining the configuration of the present example embodiment.

By cutting the multilayer block into a predetermined size, the multilayer chip is cut out. At this time, the corner portions and ridge portions of the multilayer chip may be rounded by, for example, barrel polishing or the like.

The multilayer chip is fired to form the multilayer body 2. The firing temperature depends on the materials of the dielectric layers 14 and the internal electrodes 15, but is, for example, preferably about 900° C. or higher and about 1400° C. or lower.

An electrically conductive paste defining and functioning as the base electrode layer 31 is applied to both end surfaces of the multilayer body 2. In the present example embodiment, each of the base electrode layers 31 is a fired layer. An electrically conductive paste including a glass component and a metal is applied to the multilayer body 2 by a method such as, for example, dipping. Then, firing treatment is performed to form each of the base electrode layers 31. The temperature of the firing treatment at this time is, for example, preferably about 700° C. or higher and about 950° C. or lower.

In the present example embodiment, the dipping is performed so that the base electrode layer 31 on the first end surface CA extends from the first end surface CA to a portion of the first main surface AA and a portion of the second main surface AB. Further, the dipping is performed so that the base electrode layer 31 on the second end surface CB extends from the second end surface CB to a portion of the first main surface AA and a portion of the second main surface AB. At this time, it is preferable that the dipping is performed so that the base electrode layer 31 on the first end surface CA extends to a portion of the first lateral surface BA and a portion of the second lateral surface BB. Further, it is preferable that the dipping is performed so that the base electrode layer 31 on the second end surface CB extends to a portion of the first lateral surface BA and a portion of the second lateral surface BB.

The multilayer chip before firing and the electrically conductive paste applied to the multilayer chip may be fired simultaneously. In this case, the fired layer is preferably formed by firing a ceramic material added instead of the glass component. At this time, as the ceramic material to be added, it is particularly preferable to use the same kind of ceramic material as that of the dielectric layers 14. In this case, an electrically conductive paste is applied to the multilayer chip before firing, and the multilayer chip and the electrically conductive paste applied to the multilayer chip are fired at the same time to form the multilayer body 2 in which the fired layer is formed.

Then, a plated layer is formed on the surface of each of the base electrode layers 31. In the present example embodiment, for example, the Ni plated layer and the Sn plated layer are formed on each of the base electrode layers. The Ni plated layer and the Sn plated layer are sequentially formed by using an electrolytic plating method. As the plating method, for example, barrel plating is preferably used.

Thus, the multilayer ceramic capacitor 1 shown in FIG. 1 is manufactured.

Advantageous Effects According to First Example Embodiment

According to the present example embodiment, it is possible to achieve the following advantageous effects.

According to the present example embodiment, in the LT cross section, the first extension portion 17A includes the first slope portion 18A that extends from the counter portion 16 and is sloped toward the lamination direction center side in the direction from the counter portion 16 toward the side spaced away from the counter portion 16, a second slope portion 19A that extends from the first slope portion 18A toward the side spaced away from the counter portion 16 and is sloped toward the lamination direction outer side T1 in the direction from the counter portion 16 toward the side spaced away from the counter portion 16, and the bent portion 20A connecting the first slope portion 18A and the second slope portion 19A. When a straight line that is tangent to a first end surface CA and extends parallel or substantially parallel to the lamination direction T is defined as an first end surface side reference line LC1, a straight line that is tangent to a first main surface AA and extends parallel or substantially parallel to the length direction L is defined as a first main surface side reference line LA1, a distance between the bent portion 20A and the first end surface side reference line LC1 is defined as x, a distance between the bent portion 20A and the first main surface side reference line LA1 is defined as y, the multilayer body 2 is divided into four regions by a straight line passing through the middle portion of the multilayer body 2 in the lamination direction T and a straight line passing through a middle portion of the multilayer body 2 in the length direction L, and a region adjacent to the first main surface AA and the first end surface CA among the divided four regions is defined as a first reference region A1, and a regression line derived based on values of the x and the y with respect to the bent portion 20A in the reference region A1 is defined as a virtual connection line VL, the virtual connection line VL intersects an effective layer portion 10.

According to such a configuration, the bent portions 20A of the first internal electrodes 15A tend to be spaced further away from the first end surface CA as the bent portions 20A become closer to the lamination direction center side T2 than the lamination direction outer side T1. With such a configuration, it is possible to reduce or prevent the cutting of the bent portion 20A in the cutting step, such that it is possible to reduce or prevent the occurrence of interface peeling in the manufacturing step.

According to the present example embodiment, when the bent portion 20A located at the outermost position on the lamination direction center side T2 is defined as the outermost bent portion 21A, the bending angle of the outermost bent portion 21A is smaller than the bending angles of the bent portions 20A located adjacent to the lamination direction outer side T1.

In the multilayer body 2, the stress at the time of cutting is likely to act to a greater extent at the positions closer to the first end surface CA, such that the interface peeling is likely to occur. According to such a configuration, the bending angle of the bent portion 20A becomes smaller as the internal electrode 15 is closer to the first main surface AA. It is possible to improve the adhesive force between the internal electrode 15 and the dielectric layer 14 by making the bending angle of the bent portion 20A smaller. Therefore, it is possible to reduce or prevent the occurrence of interface peeling in the manufacturing process efficiently.

Second Example Embodiment

Next, a multilayer ceramic capacitor 1 according to a second example embodiment of the present invention will be described with reference to FIG. 4. Hereinafter, differences from the first example embodiment will be mainly described, and the same or corresponding components as those of the first example embodiment will be denoted by the same reference numerals, and descriptions thereof may be omitted.

Figure 4:
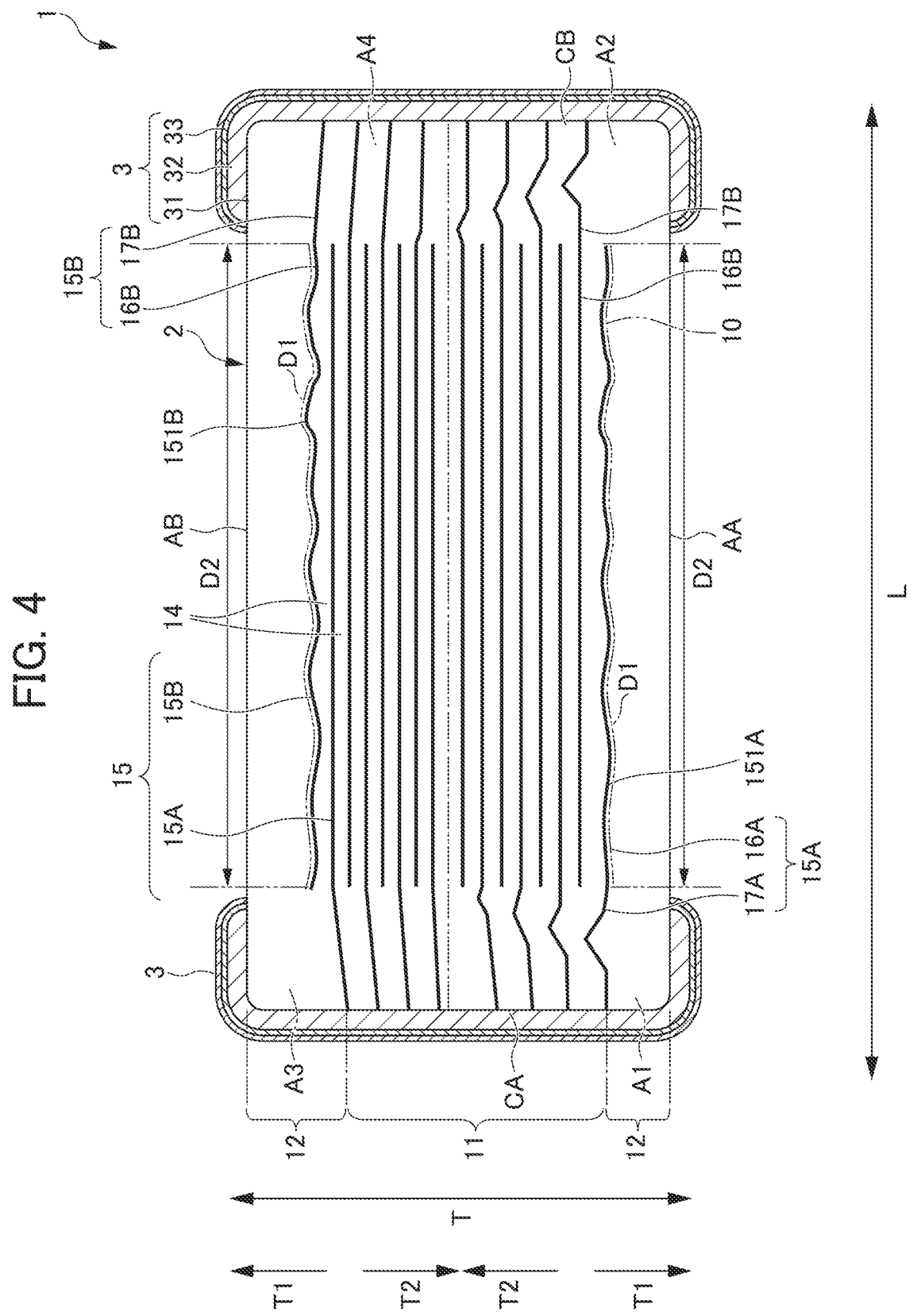
FIG. 4 is a view of a multilayer ceramic capacitor according to a second example embodiment of the present invention, and corresponds to FIG. 2.

As shown in FIG. 4, in the second example embodiment, the shape of the internal electrodes 15 is different from that in the first example embodiment.

The internal electrode 15 closest to the first main surface AA is referred to as a "first main surface side outermost internal electrode 151A". The internal electrode 15 closest to the second main surface AB is referred to as a "second main surface side outermost internal electrode 151B". In other words, the first main surface side outermost internal electrode 151A is the internal electrode 15 located at the outermost position on the lamination direction outer side T1 in the regions adjacent to the first main surface AA of the multilayer body 2. The second main surface side outermost internal electrode 151B is the internal electrode 15 located at the outermost position on the lamination direction outer side T1 in the regions adjacent to the second main surface AB of the multilayer body 2.

The first main surface side outermost internal electrode 151A and the second main surface side outermost internal electrode 151B may be collectively referred to as "each outermost internal electrode 151". The first main surface side outermost internal electrode 151A is, for example, the first internal electrode 15A. The second main surface side outermost internal electrode 151B is, for example, the second internal electrode 15B.

The length of the contour of the counter portion 16 on the lamination direction outer side T1 is defined as "D1". The separation distance in the length direction L between each end of the counter portion 16 in the length direction L is defined as "D2". The amount obtained by dividing D1 by D2 is defined as "undulation amount".

The undulation amount of the first main surface side outermost internal electrode 151A in the counter portion 16 is larger than the undulation amount of the internal electrode 15 adjacent to the first main surface side outermost internal electrode 151A in the counter portion 16, for example. The undulation amount of the second main surface side outermost internal electrode 151B in the counter portion 16 is larger than the undulation amount of the internal electrode 15 adjacent to the second main surface side outermost internal electrode 151B in the counter portion 16, for example.

When D1 or D2 is measured, the multilayer body 2 is polished to expose a predetermined cross section at the center of the LT cross section passing through the width direction W of the multilayer body 2. Then, D1 and D2 are measured in the exposed cross section. D1 is measured using a contour shape measuring machine. D2 is measured using a scanning electron microscope.

It is possible to manufacture the multilayer ceramic capacitor 1 of the second example embodiment by the following example of a method.

First, the dielectric sheet on which the pattern of the first internal electrode 15A is printed and the dielectric sheet on which the pattern of the second internal electrode 15B is printed are sequentially laminated, such that a portion to be the inner layer portion 11 is formed. The portion to be the inner layer portion 11 is then sandwiched between dielectric sheets having high fluidity on which the pattern of the internal electrode are not printed, such that a multilayer sheet is manufactured. When the multilayer sheet is hydrostatically pressed, the dielectric sheet having high fluidity defining and functioning as the outer layer portion flows, and the internal electrodes of the inner layer portion are deformed by the flow, such that the configuration of the present example embodiment can be obtained. Advantageous Effects According to Second Example Embodiment According to the present example embodiment, it is possible to achieve the following advantageous effects.

According to the present example embodiment, the undulation amount of the first main surface side outermost internal electrode 151A in the counter portion 16 is larger than the undulation amount of the internal electrode 15 adjacent to the first main surface side outermost internal electrode 151A in the counter portion 16. The undulation amount of the second main surface side outermost internal electrode 151B in the counter portion 16 is larger than the undulation amount of the internal electrode 15 adjacent to the second main surface side outermost internal electrode 151B in the counter portion 16.

The outer layer portions 12 and the inner layer portion 11 have different elastic moduli. Therefore, in the manufacturing process of the multilayer ceramic capacitors, when stress is applied to the multilayer body chip, stress is likely to be applied to the interface between the outer layer portions 12 and the inner layer portion 11. Thus, interfacial peeling is likely to occur between the outer layer portions 12 and the inner layer portion 11. However, according to such a configuration, since the contact area between each of the outermost internal electrodes 151 and the outer layer portion 12 can be increased by increasing the undulation amount of each of the outermost internal electrodes 151, it is possible to improve the adhesive force between each of the outermost internal electrodes 151 and the outer layer portion 12. With such a configuration, it is possible to reduce or prevent the interface peeling between the outer layer portions 12 and the inner layer portion 11.

Third Example Embodiment

Next, a multilayer ceramic capacitor 1 according to a third example embodiment of the present invention will be described with reference to FIG. 5. Hereinafter, differences from the first example embodiment will be mainly described, and the same or corresponding components as those of the first example embodiment will be denoted by the same reference numerals and description thereof may be omitted.

Figure 5:
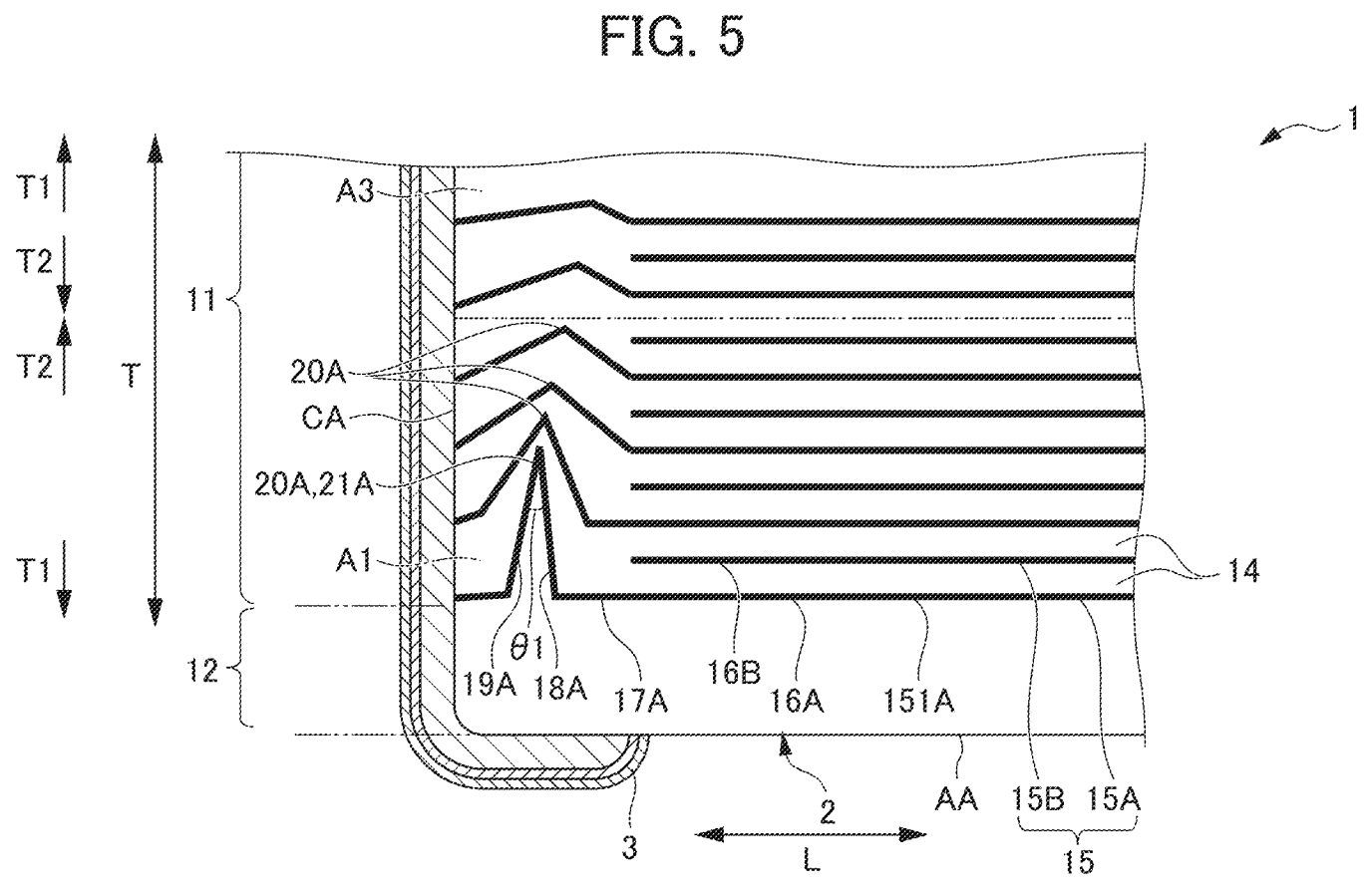

As shown in FIG. 5, in the third example embodiment, the bending angle of the outermost bent portion 21A of the first main surface side outermost internal electrode 151A is smaller than that in the above-described example embodiments.

The bending angle of the outermost bent portion 21A is preferably smaller than about 30°, for example.

The multilayer ceramic capacitor 1 of the third example embodiment can be manufactured by the following example method.

Similarly to the first example embodiment, at the time of hydrostatic press, the multilayer sheet is sandwiched by metal plates having protruding shapes in a location corresponding to the extension region in the multilayer sheet. Further, by adjusting the protruding shapes of the metal plates and increasing the pressure of the hydrostatic press, then bending progresses, such that the configuration of the present example embodiment can be obtained.

Advantageous Effects According to Third Example Embodiment

According to the present example embodiment, it is possible to achieve the following advantageous effects.

The bending angle of the outermost bent portion 21A is, for example, smaller than about 30°.

According to such a configuration, it is possible to make the outer layer portion 12 deeply bite into the outermost internal electrode. Therefore, it is possible to improve the adhesive force between the outer layer portion 12 and the first main surface side outermost internal electrode 151A. With such a configuration, when the outer layer portion 12 is to be peeled off from the first end surface CA, it is possible to reduce or prevent the progress of the peeling of the outer layer portion 12 at the position of the outermost bent portion 21A. Therefore, it is possible to reduce or prevent the interface peeling between the outer layer portion 12 and the inner layer portion 11 can be suppressed.

Although example embodiments of the present invention have been described above, the present invention is not limited to the example embodiments described above, and various changes and modifications thereto are possible.

In the above-described example embodiments, a multilayer ceramic capacitor in which the dielectric layers 14 made of dielectric ceramic are used as ceramic layers is exemplified as the multilayer ceramic electronic component. However, the multilayer ceramic electronic component of the present disclosure is not limited thereto. For example, the ceramic electronic components according to example embodiments of the present invention can be applied to various multilayer ceramic electronic components such as, for example, a piezoelectric component using a piezoelectric ceramic as a ceramic layer, a thermistor using a semiconductor ceramic as a ceramic layer, and an inductor using a magnetic ceramic as a ceramic layer. Piezoelectric ceramics include PZT (lead zirconate titanate) ceramics, semiconductor ceramics include spinel ceramics, and magnetic ceramics include ferrite ceramics, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:

a multilayer body including an inner layer portion including a plurality of ceramic layers and a plurality of internal electrodes that are alternately laminated, a first main surface and a second main surface opposed to each other in a lamination direction, a first lateral surface and a second lateral surface opposed to each other in a width direction orthogonal or substantially orthogonal to the lamination direction, and a first end surface and a second end surface opposed to each other in a length direction orthogonal or substantially orthogonal to the lamination direction and the width direction; and external electrodes provided respectively on one of the first end surface or the second end surface; wherein each of the plurality of internal electrodes includes a counter portion opposed to an adjacent internal electrode in the lamination direction and an extension portion extending from the counter portion and is connected to one of the external electrodes;

the multilayer body includes an effective layer portion including the counter portion of each of the plurality of internal electrodes and portions of the plurality of ceramic layers sandwiched by the counter portions that are adjacent to each other;

when directions from a middle portion of the multilayer body in the lamination direction to each of the first main surface and the second main surface in the lamination direction are each defined as a lamination direction outer side, and directions from each of the first main surface and the second main surface to the middle portion of the multilayer body in the lamination direction are each defined as a lamination direction center side, and a cross section parallel or substantially parallel to the lamination direction and the length direction is defined as an LT cross section;

in the LT cross section, the extension portion includes a first slope portion that extends from the counter portion and is sloped toward the lamination direction center side in a direction from the counter portion toward a side away from the counter portion, a second slope portion that extends from the first slope portion toward the side away from the counter portion and is sloped toward the lamination direction outer side in a direction from the counter portion toward the side away from the counter portion, and a bent portion connecting the first slope portion and the second slope portion; and when a straight line that is tangent to one of the first end surface or the second surfaces and extends parallel or substantially parallel to the lamination direction is defined as an end surface side reference line, a straight line that is tangent to one of the first main surface or the second main surface and extends parallel or substantially parallel to the length direction is defined as a main surface side reference line, a distance between the bent portion and the end surface side reference line is defined as x, a distance between the bent portion and the main surface side reference line is defined as y, the multilayer body is divided into four regions by a straight line passing through the middle portion of the multilayer body in the lamination direction and a straight line passing through a middle portion of the multilayer body in the length direction, and one of the divided four regions is defined as a reference region, and a regression line derived based on values of the x and the y with respect to the bent portion in the reference region is defined as a virtual connection line, the virtual connection line intersects the effective layer portion at a position that is closer to a center position of the effective layer portion in the lamination direction than to outermost positions of the effective layer portion in the lamination direction.

2. The multilayer ceramic electronic component according to claim 1, wherein, when the bent portion located at an outermost position on the lamination direction outer side in the reference region is defined as an outermost bent portion, a bending angle of the outermost bent portion is smaller than a bending angle of bent portions located adjacent to the lamination direction center side.

3. The multilayer ceramic electronic component according to claim 2, wherein the bending angle of the outermost bent portion is smaller than about 30°.

4. The multilayer ceramic electronic component according to claim 1, wherein, when an internal electrode of the plurality of internal electrodes located at the outermost position on the lamination direction outer side is defined as an outermost internal electrode, an amount obtained by dividing a length of a contour of the counter portion in the lamination direction outer side by a separation distance in the length direction between each end of the counter portion in the length direction is defined as an undulation amount, the undulation amount of the outermost internal electrode in the counter portion is larger than the undulation amount of one of the internal electrodes adjacent to the outermost internal electrode in the counter portion.

5. The multilayer ceramic electronic component according to claim 1, wherein a dimension in the length direction of the multilayer body is about 0.2 mm or more and about 10 mm or less;

a dimension of the multilayer body in the lamination direction is about 0.05 mm or more and about 10 mm or less; and a dimension of the multilayer body in the width direction W is about 0.1 mm or more and about 10 mm or less.

6. The multilayer ceramic electronic component according to claim 1, wherein a dimension in the length direction of the multilayer body is about 0.2 mm or more and about 6 mm or less;

a dimension of the multilayer body in the lamination direction is about 0.1 mm or more and about 5 mm or less; and a dimension of the multilayer body in the width direction W is about 0.1 mm or more and about 5 mm or less.

7. The multilayer ceramic electronic component according to claim 1, wherein each of the plurality of ceramic layers includes $BaTiO_3$ as a main component.

8. The multilayer ceramic electronic component according to claim 7, wherein each of the plurality of ceramic layers includes Mn compound, Fe compound, Cr compound, Co compound, or Ni compound as a subcomponent.

9. The multilayer ceramic electronic component according to claim 1, wherein a thickness of each of the plurality of ceramic layers is about 0.2 μm or more and about 15 μm or less.

10. The multilayer ceramic electronic component according to claim 1, wherein a thickness of each of the plurality of ceramic layers is about 0.5 μm or more and about 2.0 μm or less.

11. The multilayer ceramic electronic component according to claim 1, wherein each of the plurality of internal electrodes includes Ni, Cu, Ag, Pd, Ag—Pd alloy, or Au.

12. The multilayer ceramic electronic component according to claim 1, wherein a thickness of each of the plurality of internal electrodes is about 0.2 μm or more and about 2.0 μm or less.

13. The multilayer ceramic electronic component according to claim 1, wherein a number of the plurality of internal electrodes is 10 to 700.

14. The multilayer ceramic electronic component according to claim 1, wherein a number of the plurality of internal electrodes is 15 to 1000.

15. The multilayer ceramic electronic component according to claim 1, wherein each of the external electrodes includes a base electrode layer and a plated layer.

16. The multilayer ceramic electronic component according to claim 15, wherein the base electrode layer is a fired layer.

17. The multilayer ceramic electronic component according to claim 16, wherein the fired layer includes Cu and glass.

18. The multilayer ceramic electronic component according to claim 15, wherein the plated layer includes a Ni plated layer on the base electrode layer and a Sn plated layer on the Ni plated layer.

19. The multilayer ceramic electronic component according to claim 15, wherein a thickness of the base electrode layer on the respective one of the first and second end surfaces is about 2 μm or more and about 220 μm or less.

20. The multilayer ceramic electronic component according to claim 15, wherein a thickness of the base electrode layer on the respective one of the first and second end surfaces is about 3 μm or more and about 200 μm or less.

* * * * *